(12) United States Patent
Wimmer et al.

(10) Patent No.: US 12,468,786 B2
(45) Date of Patent: Nov. 11, 2025

(54) CHECKING A LICENSE FOR THE USAGE OF AT LEAST ONE PERFORMANCE PROPERTY IN AN INTERNET-OF-THINGS (IoT) DEVICE

(71) Applicant: Siemens Aktiengesellschaft, Munich (DE)

(72) Inventors: Martin Wimmer, Neubiberg (DE); Rainer Falk, Erding (DE); Stefan Seltzsam, Aying (DE); Sebastian Ries, Aschheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/573,476

(22) PCT Filed: Jun. 8, 2022

(86) PCT No.: PCT/EP2022/065541
§ 371 (c)(1),
(2) Date: Dec. 22, 2023

(87) PCT Pub. No.: WO2023/274672
PCT Pub. Date: Jan. 5, 2023

(65) Prior Publication Data
US 2024/0265069 A1 Aug. 8, 2024

(30) Foreign Application Priority Data
Jun. 30, 2021 (EP) .................................... 21182801

(51) Int. Cl.
*G06F 21/10* (2013.01)
(52) U.S. Cl.
CPC ...... *G06F 21/1077* (2023.08); *G06F 21/1011* (2023.08)

(58) Field of Classification Search
CPC ......................... G06F 21/1077; G06F 21/1011
(Continued)

(56) References Cited

U.S. PATENT DOCUMENTS 5,319,765 A * 6/1994 Kimura ................... G06F 21/79
711/164
5,345,561 A * 9/1994 Kato ..................... G06F 3/0601
360/71

(Continued)

FOREIGN PATENT DOCUMENTS

CN 202171804 U * 3/2012
CN 109284615 A * 1/2019 ........... G06F 21/602

(Continued)

OTHER PUBLICATIONS

Lux, Zoltán András, Felix Beierle, Sebastian Zickau, and Sebastian Göndör. "Full-text search for verifiable credential metadata on distributed ledgers." In 2019 Sixth International Conference on Internet of Things: Systems, Management and Security (IOTSMS), pp. 519-528. IEEE, 2019. (Year: 2019).*

(Continued)

*Primary Examiner* — Luu T Pham
*Assistant Examiner* — Walter J Malinowski
(74) *Attorney, Agent, or Firm* — Schmeiser, Olsen & Watts LLP

(57) ABSTRACT

A method for checking a license for the usage of at least one performance property in an Internet of things device, is provided, having the steps of —ascertaining at least one license condition for the usage of the performance property of the IoT device by at least one attribute contained in a license identifier, —transmitting and storing the license identifier, —checking the license condition by a) generating a pseudo-access which is assigned to the performance property using a pseudo-holding unit and b) checking an autho- (Continued)

rization for the pseudo-access by checking the attribute of the license identifier using a verification unit, and —activating the at least one performance property if the pseudo-access is confirmed, wherein the license identifier, the pseudo-holding unit, and the verification unit are designed based on a specification for verifiable credentials.

15 Claims, 2 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 10,454,927 | B2* | 10/2019 | Oberhauser | G06F 21/62 |
| 10,554,726 | B1* | 2/2020 | Mattison | H04L 69/08 |
| 10,581,874 | B1* | 3/2020 | Khalid | H04L 63/1425 |
| 11,693,931 | B2* | 7/2023 | Casey | H04W 4/02 |
| | | | | 726/26 |
| 2003/0140255 | A1 | 7/2003 | Clark et al. | |
| 2003/0235185 | A1* | 12/2003 | Gibbs | H04L 12/5692 |
| | | | | 370/352 |
| 2004/0260939 | A1* | 12/2004 | Ichikawa | G06F 21/53 |
| | | | | 713/168 |
| 2005/0223415 | A1* | 10/2005 | Oho | G06F 21/606 |
| | | | | 713/176 |
| 2006/0073890 | A1* | 4/2006 | McAllister | A63F 13/30 |
| | | | | 463/29 |
| 2006/0179002 | A1* | 8/2006 | Brooks | G06F 21/10 |
| | | | | 705/59 |
| 2007/0192834 | A1* | 8/2007 | Song | H04N 21/25816 |
| | | | | 726/3 |
| 2010/0161499 | A1* | 6/2010 | Holcombe | G06Q 50/184 |
| | | | | 705/310 |
| 2012/0066463 | A1* | 3/2012 | Rice | H04L 67/306 |
| | | | | 711/161 |
| 2012/0204269 | A1* | 8/2012 | Gardner | G06F 21/1075 |
| | | | | 726/26 |
| 2012/0216296 | A1* | 8/2012 | Kidron | G06F 16/9535 |
| | | | | 726/28 |
| 2015/0082420 | A1 | 3/2015 | Love et al. | |
| 2016/0259923 | A1* | 9/2016 | Papa | H04W 12/35 |
| 2018/0107977 | A1* | 4/2018 | McHale | G06Q 10/0834 |
| 2019/0050309 | A1* | 2/2019 | Smith | G06F 11/2242 |
| 2019/0149558 | A1* | 5/2019 | Phan | H04W 12/126 |
| | | | | 713/164 |
| 2019/0289006 | A1* | 9/2019 | Fang | H04L 63/0884 |
| 2019/0372876 | A1* | 12/2019 | Marrone | H04L 43/08 |
| 2020/0103894 | A1* | 4/2020 | Cella | G05B 23/0289 |
| 2021/0014065 | A1* | 1/2021 | Gourisetti | H04L 9/0637 |
| 2021/0036866 | A1* | 2/2021 | Zolfonoon | H04L 67/34 |
| 2021/0075825 | A1* | 3/2021 | Davis | H04L 63/1416 |
| 2021/0228893 | A1* | 7/2021 | Akram | A61N 1/3925 |
| 2021/0326331 | A1* | 10/2021 | Shin | H04L 69/16 |
| 2021/0337878 | A1* | 11/2021 | Gretton | A24F 40/53 |
| 2021/0349801 | A1* | 11/2021 | Rafey | G06F 11/3495 |

FOREIGN PATENT DOCUMENTS

| | | | | |
|---|---|---|---|---|
| CN | 210888402 U | * | 6/2020 | |
| CN | 112311530 A | | 2/2021 | |
| EP | 4114050 A1 | * | 1/2023 | G06F 21/121 |
| JP | 2004362472 A | * | 12/2004 | |
| JP | 2017114121 A | * | 6/2017 | |
| KR | 20180045613 A | * | 5/2018 | |
| WO | WO-2023274672 A1 | * | 1/2023 | G06F 21/121 |

OTHER PUBLICATIONS

Moreno. "The OLYMPUS architecture—Oblivious identity management for private user-friendly services." Sensors 20, No. 3 (2020): 945. (Year: 2020).*

Otto, N., S. Lee, B. Sletten, D. Burnett, M. Sporny, and K. Ebert. Verifiable Credentials Use Cases; W3C Working Group Note. Sep. 24, 2019. 2019. (Year: 2019).*

Annadurai, Distributed Authentication using Self Sovereign Identities, 2024 1st International Conference on Emerging Technologies for Dependable Internet of Things (ICETI) (2024, pp. 1-8) (Year: 2024).*

Sun, Pan Jun. "Privacy protection and data security in cloud computing: a survey, challenges, and solutions." Ieee Access 7 (2019): 147420-147452. (Year: 2019).* https://www.w3.org/TR/vc-data-model/ retrieved Jun. 30, 2021.
https://www.w3.org/TR/did-use-cases/ retrieved Jun. 30, 2021.
https://www.w3.org/TR/vc-use-cases retrieved Jun. 30, 2021.

Brunner, Clemens et al: "DID and VC: Untangling Decentralized Identifiers and Verifiable Credentials for the Web of Trust"; 2020 The 4th International Conference On Big Data Research; ACMPUB27; New York; NY; USA; Dec. 14, 2020; pp. 61-66; XP058587048; DOI: 10.1145/3446983.3446992; 2020.

PCT International Search Report corresponding to PCT International Application No. PCT/EP2022/065541 mailed Sep. 13, 2022.

* cited by examiner

CHECKING A LICENSE FOR THE USAGE OF AT LEAST ONE PERFORMANCE PROPERTY IN AN INTERNET-OF-THINGS (IoT) DEVICE

CROSS-REFERENCE TO RELATED APPLICATIONS

This application claims priority to PCT Application No. PCT/EP2022/065541, having a filing date of Jun. 8, 2022, which claims priority to European Application No. 21182801.7, having a filing date of Jun. 30, 2021, the entire contents both of which are hereby incorporated by reference.

FIELD OF TECHNOLOGY

The following relates to a method for checking a license for using at least one performance feature in an Internet-of-Things (IoT) device on the basis of a license identifier.

BACKGROUND

The licensing of software or individual features of software is a common requirement which arises both in the consumer sector and in the enterprise environment and for industrial applications. In addition to the licensing of software, functions on devices may also be enabled on the basis of a license. Devices, for example an IoT edge device, a machine or motor vehicles, are manufactured and sold once. An IoT edge device is a component which is connected to a communication network, is at the edge of the network and ensures network transition to a core network of a company or a service provider.

However, the scope of services or the features used by a user during the service life of the devices is/are not permanently predefined and may vary depending on license models. Providers of such higher-quality services often use licensing models which relate to the type and quality of the data and functions to be assessed. For example, a connection to cloud systems using specific protocols or the use of specific data types may be tied to licenses. Industrial functions, for example control of a machine tool or a substation, which are provided on generic white box hardware, for example an industrial PC or an edge computing platform, can also be increasingly implemented in software and marketed. Edge computing denotes decentralized data processing which is carried out at the edge of the network.

This has previously been solved, for example, using monitoring mechanisms which for this purpose can request and evaluate contract/license information, for which purpose the devices typically have web connectivity and back-end systems of the licensor are included in the evaluation. In situations in which no connection or no permanent connection to systems belonging to the provider is available, use is generally made of license files and/or hardware dongles which are used to permanently install licenses. Cryptographically protected license information is often delivered using license files or a cryptographically formed license code. These are read in, verified and evaluated by the corresponding software product or device.

The solutions discussed relate to the license protection and integrity protection of software. Software is delivered in a protected form, for example in an encrypted form, and can be used only with the aid of a suitable dongle (key which implements a corresponding license). This relates, in particular, to the fact that devices and the software executed on the latter are used by the customer, that is to say are no longer directly accessible by and within the control of the manufacturer, with the result that there is a wish to be protected from any manipulation/license circumvention by the end user.

The work by the Verifiable Credentials (VC) Working Group in combination with work by the Decentralized Identifiers (DID) Working Group, also see for example https://www.w3.org/TR/did-use-cases/, of the World Wide Web Consortium, W3C for short, deals with the standardized description of properties/guarantees, also called claims, which can be checked/verified, see the data model https://www.w3.org/TR/vc-data-model/. An important property of verifiable credentials (VC) is the fact that they can be verified automatically. They are therefore suitable for different applications, for example the verification of certifications and personal data such as identification data, for the online request of documents or access. Various applications such as, inter alia, the use of VC to verify the origin/authenticity of devices or to detect and eliminate forgeries/counterfeit products are described at https://www.w3.org/TR/vc-use-cases. The use of VC for licensing is not described there, but the system model on which VC are based is also not conceptually suitable for licensing.

SUMMARY

An aspect relates to an improved license check, in particular for dynamic applications in which licenses must be renewed or amended during operation of a device, and to provide it with little development outlay.

According to a first aspect, embodiments of the invention relate to a method for checking a license for using at least one performance feature in an Internet-of-Things (IoT) device on the basis of a license identifier, comprising:
stipulating at least one license condition for using the performance feature of the IoT device by at least one attribute contained in the license identifier,
transmitting and storing the license identifier on the IoT device,
checking the license conditions by
a) generating pseudo-access assigned to the performance feature of the IoT device by a pseudo-holder function formed on the IoT device, and
b) checking an authorization for the pseudo-access by checking the attributes of the license identifier by a verification function formed on the IoT device, and
activating the at least one performance feature if the pseudo-access is confirmed as permitted by a positive checking result for the license identifier,
wherein the license identifier, the pseudo-holder unit and the verification unit are designed on the basis of a specification for verifiable credentials of the World Wide Web Consortium (W3C).

The license check in the IoT device is simulated by pseudo-access to a license identifier assigned to the licensed performance feature by the pseudo-holder with functions and processes based on the verifiable credential specification of the World Wide Web Consortium. However, on account of the different objective in the case of the license check in comparison with a conventional use of DID/VC during authentication between a user and a node, adaptations of the basic technology are required. A substantial difference is that both the pseudo-holder unit and the verification unit are formed in the IoT device, that is to say the pseudo-holder unit and the verification unit are implemented in the same IoT device. The pseudo-holder unit corresponds to a modified role of the holder of the VC specification. The verification unit corresponds to a modified role of the verifier of the VC specification.

The IoT device may be, for example, a control device of a cyber-physical system, for example of an industrial automation system, or a communication device. The license relates to performance features, in particular from the physical world. Examples of performance features in an IoT device, in particular in an IoT edge device, are support for specific protocols, higher/lower sampling rates or accuracies of sensor data. Examples of performance features in a motor vehicle are changed acceleration modes with higher or lower power, autonomous driving or additional online services and the like. The IoT device is also synonymously referred to as a device below.

This has the advantage that a decentralized identifiers (DID)/verifiable credential (VC) infrastructure and corresponding tools and libraries can be used to implement license protection, with the result that there is no need to develop a specific technical solution for managing and checking licenses. A general DID/VC infrastructure, which is used for example to authenticate and manage authorizations of users, can be concomitantly used to implement a license check. As a result, a licensing solution can be achieved and operated with less outlay than when using specific licensing tools.

In an embodiment, the license identifier is stored on the device before or during operation of the device.

This has the advantage that the license identifier and therefore the license conditions are not only stipulated and introduced into the device before activating the device, but rather license conditions can also be applied to the device during operation. Furthermore, devices can be manufactured irrespective of the subsequent use and it is possible to stipulate only later at the operating time the purpose for which the device is used.

In an embodiment, the license identifier is transmitted again to the IoT device during operation of the IoT device and the stored license identifier is replaced or supplemented.

This has the advantage of the license identifier and therefore the license conditions being able to be renewed and/or supplemented during the service life of the device.

In an embodiment variant, the transmission of the license identifier from a license server to the IoT device is initiated from outside the IoT device and is transmitted to the IoT device. Alternatively, the transmission of the license identifier is initiated by an application on the IoT device itself. In this case, the license identifier is retrieved from the license server by the IoT device.

In an embodiment variant, the pseudo-access is repeatedly generated and checked when starting the IoT device or when starting the performance feature on the IoT device, and/or during operation.

This stipulates the time for carrying out the license check. The license check is carried out, in particular, at the time at which the licensed performance feature is started or when starting the IoT device. In some embodiments, further pseudo-access operations can be generated during ongoing operation, and the performance feature can be activated or enabled at a later time depending on the result of the check, or the performance feature can be deactivated or blocked in the event of a negative checking result.

In an embodiment variant, the IoT device is in the form of a physically independent device or is in the form of a software-based virtual device distributed over one or more hardware platforms.

The license can therefore be flexibly checked on differently designed IoT devices. The proposed license check can therefore be carried out both on real, physically present devices and on virtually designed devices. The hardware platform may be, in particular, a hardware-based "compute platform".

In an embodiment variant, the pseudo-holder unit of the IoT device is formed as part of a software application, as part of an execution environment of the software application or by an operating system of the IoT device.

If the IoT device is virtualized, it is in the form of a virtual machine (VM) image or a container image, for example. If such an image is executed, the IoT device as a whole "really" exists. A corresponding image then comprises the operating system and applications, as would be the case in a hardware-based device.

In an embodiment variant, the pseudo-holder unit and the verification unit are formed on a common hardware platform. Alternatively, the pseudo-holder unit and the verification unit are formed on different platforms that are locally connected to one another.

This allows the license to be checked even on IoT devices structured in a distributed manner. Furthermore, a device-internal but platform-specific license allocation can be implemented as a result of the pseudo-holder unit and the verification unit being distributed among different hardware platforms.

In an embodiment variant, the verification unit checks a who attribute in the license identifier, which indicates an IoT device authorized to activate the performance feature, against a verification platform identifier of the verification platform.

In embodiments, the who attribute may be formed by a "subject" attribute in a verifiable credential VC corresponding to the W3C VC specification. The who attribute can be used, in particular, to check and enforce a license tied to a specific device entity or a component of a device. The who attribute indicates the device for which the license is intended. Further environmental information, for example operator ID, location, runtime environment, software application, device type, or version, can also be included in the who attribute. If the who attribute is empty, that is to say not assigned, no check against an executing unit of the performance feature is carried out.

In an embodiment variant, the verification unit checks a what attribute in the license identifier, which indicates further conditions for activating the performance feature or for activating options of the performance feature.

The verification unit accepts the license identifier only when the attributes which are confirmed in the what attribute and characterize the relevant permissible execution environment correspond to the determined characteristics of the execution environment of the performance feature. The license conditions can therefore be checked and enforced. Characteristics of the execution environment are, for example, an operator identifier, location, runtime environment, software application, type and/or version of the IoT device.

In an embodiment variant, the verification unit checks a security attribute in the license identifier, which comprises a cryptographic identifier of an issuer of the license identifier.

The license identifier is checked as valid by the verification unit and the pseudo-access is confirmed as permitted only when the security attribute is confirmed. The security attribute comprises, for example, a signature of a known and trusted licensing authority.

In an embodiment variant, a first license identifier is issued by a license creation unit outside the IoT device and/or a second license identifier is issued by a license creation unit inside the IoT device and is stored on the IoT device, and the first license identifier specifies properties of the execution environment in which the verification unit is executed, the second license identifier comprises the properties actually available in the IoT device, and the first and second license identifiers are checked by the verification unit of the license identifiers against the properties of the present execution environment of the verification unit.

The license identifier therefore cannot only be issued, as a first license identifier, by a license creation unit arranged outside the IoT device, but also by a license creation unit integrated in the IoT device. The verification unit checks whether the information relating to the required execution environment in the license identifier corresponds to the information relating to the actual execution environment in the VC platform information.

In a further embodiment variant, a third license identifier is issued by a confirmation issuing unit outside the IoT device. The third license identifier confirms an IoT device property, for example the fact that the device has been identified as not having been manipulated by a security monitoring system and is therefore considered to be unmanipulated. The confirmation issuing unit outside the IoT device usually differs from the issuing unit that issues the first license identifier and is outside the IoT device.

In an embodiment variant, the license identifier is in the form of an anonymous verifiable credential, and the verification unit checks only the presence of at least one specific attribute, but not the content of the attribute.

An anonymous verifiable credential only makes it possible to determine whether specific attributes are present, that is to say are confirmed as correct by the license identifier.

In an embodiment variant, the performance feature is a software container, and the license identifier is used to manage and control a software container infrastructure. Alternatively, the performance feature is a software application or a hardware component of the IoT device.

The license identifier can therefore be flexibly used in different technical fields.

A second aspect of embodiments of the invention relate to an arrangement for checking a license for using at least one performance feature in an Internet-of-Things (IoT) device on the basis of a license identifier, comprising:

a license issuing unit which is designed
  to stipulate at least one license condition for using the performance feature of the IoT device by at least one attribute contained in the license identifier,
  to transmit the license identifier to the IoT device, and the IoT device is designed
  to store the license identifier,
  to check the license conditions by
  a) generating pseudo-access assigned to the performance feature of the IoT device by a pseudo-holder unit formed on the IoT device, and
  b) checking an authorization for the pseudo-access by checking the attributes of the license identifier by a verification unit formed on the IoT device, and
  to activate the at least one performance feature if the pseudo-access is confirmed as permitted by the verification unit by a positive checking result for the license identifier, wherein the license identifier, the pseudo-holder unit and the verification unit are designed on the basis of a specification for verifiable credentials of the World Wide Web Consortium (W3C for short).

In embodiments, the method and the arrangement enable simple and automatable license production during the runtime, that is to say when the IoT device and applications are operating. In embodiments, the method and the arrangement are therefore also suitable, in particular, for industrial use, that is to say in situations when often no direct manual access to a device is possible. Only at the runtime or after successful licensing is it stipulated which functionality is available to the licensee. In this case, a device may be formed such that it provides initialization interfaces which can be used to securely install the license in the form of the license identifier. License provisions can therefore be adapted/replaced during the useful life. The license evaluation can be implemented in a fine-tuned manner and, in addition to the device context, for example a check of the hardware entity, may also include the nearby environment, for example an identification of the user by way of DID. If the device is set up, for example, in a different environment, unauthorized use can be restricted/prevented in a controlled manner in this case.

Using VC and DID makes it possible to implement license evaluation even in off-line scenarios. That is to say, the devices do not require a permanent connection to a license server, with the result that the use in separated networks is also suitable. The advantages of DID and VC are generally transferred to the licensing method shown. Licensors or licensees therefore must provide only the information required for the license check for the purpose of validation.

A third aspect of embodiments of the invention relate to a computer program product (non-transitory computer readable storage medium having instructions, which when executed by a processor, perform actions), for example, comprising a non-volatile computer-readable medium which can be loaded directly into a memory of a digital computer, comprising program code parts which, when the program code parts are executed by a digital computer, cause the latter to carry out the steps of the method.

Unless stated otherwise in the following description, the terms "stipulate", "transmit", "check" and the like may relate to actions and/or processes and/or processing steps which change and/or generate data and/or convert the data into other data, wherein the data are represented or may be present, in particular, as physical variables, for example electrical pulses.

The respective "unit", for example the license issuing unit or the IoT device, may be implemented using hardware and/or software. In the case of a hardware implementation, the respective unit may be in the form of an apparatus or part of an apparatus, for example in the form of a computer or a microprocessor or a control computer of a vehicle. In the case of a software implementation, the respective unit may be in the form of a computer program product, a function, a routine, part of a program code or an executable object.

A computer program product, for example a computer program means, may be provided or delivered, for example, as a storage medium, for example a memory card, a USB stick, a CD-ROM, a DVD or in the form of a downloadable file from a server in a network. This may be effected, for example in a wireless communication network, by transmitting a corresponding file to the computer program product or the computer program means.

Exemplary embodiments of the method according to the invention and of the system according to the invention are illustrated by way of example in the drawings and are explained in more detail on the basis of the following description. In the drawings:

BRIEF DESCRIPTION

Some of the embodiments will be described in detail, with references to the following Figures, wherein like designations denote like members, wherein.

DETAILED DESCRIPTION

The sequences and roles specified by W3C according to verifiable credentials VC and decentralized identifiers (DID for short) are abbreviated as DID/VC below and the corresponding verifiable credential is referred to as VC for short.

Figure 1:
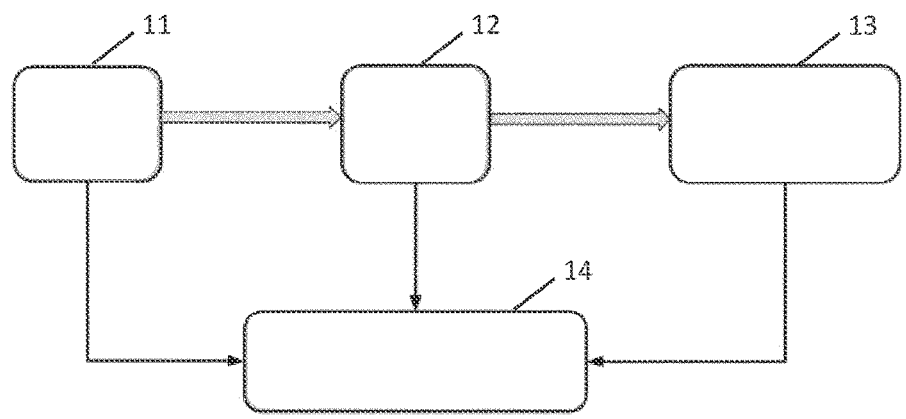
FIG. 1 shows a role model of the verifiable credentials, corresponding to the W3C specification "VC-data model"

However, on account of the different objective in the case of the license check in comparison with the conventional use of DID/VC during authentication between users/nodes, adaptations of the basic technology are required. In a VC solution according to the prior art, see FIG. 1, a distinction is made between the roles of issuer 11, holder 12, verifier 13 and subject 14. An issuer 11 issues a verifiable credential VC and makes it available to a holder 12. The holder 12 uses the VC to form a verifiable presentation which it can use to verify specific attributes (properties, claims) confirmed by means of the VC from the issuer 11 in relation to a verifier 13. In a special case, a VC can also be used directly as a verifiable presentation. The attributes confirmed by the VC are assigned to the subject. The holder 12 itself can generally represent the subject. However, the subject can also confirm the holder 12 of a VC representative of a subject attribute of the subject. A verifiable data registry 14 stores identifiers and usage schemes.

However, in embodiments of the present licensing solution, there are other roles and other objectives. One difference is the concept of an issuer of license information, usually the manufacturer of the IoT device or of software that implements a virtual IoT device. The device/software assumes a different role by activating certain performance features or enabling their use on the basis of the license information. Furthermore, the objective is not to check whether an accessing party is authorized, but rather to check whether or not the specific entity, that is to say the device/software which carries out the check itself, can activate the feature. There is no access by an accessing party, as in the case of an access control system, for which VC were developed.

However, the following aspects can be adopted from a VC/DID solution into the license checking method according to embodiments of the invention. A license issuing unit may take on the role of the VC issuer 11 and may generate license identifiers on the basis of VCs which generate the licensing information. The IoT device/software can take on the role of the VC verifier 13 and can check the license identifier, that is to say a provided modified VC or, strictly speaking, a verifiable presentation VP, and can enable or activate a functionality in the IoT device/software on the basis thereof.

However, since a license check differs conceptually from conventional access control, the concepts of "subject" and "holder" of verifiable credentials VC cannot be mapped to roles of a license check without being changed.

Adaptations are therefore proposed in order to implement a licensing solution using VC. The basic idea is that the IoT device which carries out the licensing check combines the VC roles of the verifier 13 and of the holder 12 and possibly additionally of the subject. It internally carries out pseudo-access assigned to a performance feature that can be enabled. The performance feature is activated or enabled depending on whether the access is permissible according to an available license identifier based on a structure of the VC.

Figure 2:
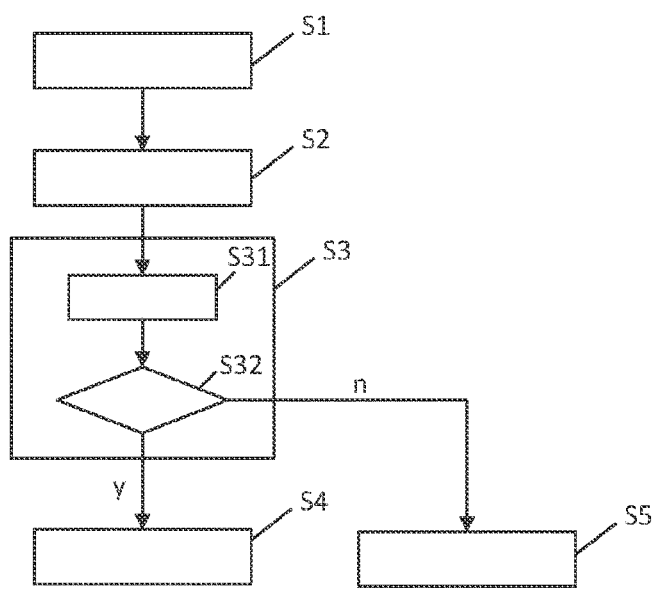
FIG. 2 shows an exemplary embodiment of a method in the form of a flowchart.

An exemplary embodiment of the method is described using FIG. 2.

In order to check a license for using at least one performance feature in an Internet-of-Things (IoT) device, at least one license condition for using the performance feature of the IoT device is stipulated in a first method step S1 by at least one attribute contained in the license identifier. The license identifier is then transmitted to the IoT device and stored there, see S2. The license conditions are now checked in the subsequent method step S3.

For this purpose, a pseudo-holder function formed on the IoT device generates pseudo-access to the performance feature assigned to the license identifier, see step S31. The verification unit of the IoT device then checks, in step S32, whether the pseudo-access is authorized by the pseudo-holder unit. For this purpose, the attributes of the license identifier are checked by the verification unit. If the check of the attributes results in a positive checking result, that is to say the attributes indicated as confirmed in the license identifier are complied with by an execution platform of the performance feature, the performance feature is activated, see step S4. If the checking result is negative and at least one of the attributes is not complied with, the activation of the performance feature is denied and is therefore not carried out. In this case, in order to check the license identifier, in particular the license identifiers, the pseudo-holder unit and the verification unit are designed for processes and sequences based on a specification for verifiable credentials of the World Wide Web Consortium (W3C).

The IoT device is in the form of a physically independent device or in the form of a software-based virtual device distributed over one or more hardware platforms. Pseudo-access can take place, in particular, at the time at which the IoT device is started. In some embodiments, further pseudo-access operations can be repeated during ongoing operation, and a performance feature can be activated or enabled at a later time depending on the result or can be deactivated or blocked in the event of a negative result. The pseudo-holder unit may be formed, for example, as part of a software application, part of an execution environment of the software environment or by an operating system of the IoT device. The holder is referred to as a pseudo-holder unit since it is not an accessing party, but rather only a local unit which provides the verification unit the license identifier.

The pseudo-holder unit may be implemented on the platform of the verification unit itself or may alternatively be in the form of a separate component locally connected to the platform. The platform of the verification unit and the pseudo-holder unit may be connected locally via a direct interface, for example USB, RS 232, PCIe, I2C, SPI, optical fiber, or via a local Ethernet, local Bluetooth or local WLAN interface.

The license check, see S3 in FIG. 2, is carried out by the verification unit of the IoT device. Reference is made, in the following description, to the IoT device 50 illustrated in FIG. 4. The IoT device 50 comprises a pseudo-holder unit 52, a verification unit 53 and a hardware component 55, for example a trust anchor of the IoT device. The pseudo-holder unit 52 receives the license identifier LK, for example via a service interface 57, and stores it.

The pseudo-holder unit 52, which loads the license identifier and locally makes it available to the verification unit 53, is implemented on the platform of the IoT device 50, for example a processor or a software container or a part of the software container, on which the license check is intended to be implemented in a verification unit 53. The license identifier LK is provided, for example, from a local file system, via a configuration interface, by a download server, a device management server, a DID infrastructure, a database, a distributed database infrastructure or a web service. Provision can be initiated either by an external unit or by the IoT device 50 or an application on the IoT device. The pseudo-holder unit 52 implements the pseudo-access which is used to capture the at least one relevant license identifier LK and to make it available locally to the verification unit 53.

The pseudo-holder unit 52 may provide the verification unit 53 with the at least one license identifier directly or in a modified form as a verifiable presentation. The pseudo-holder unit 52 may be implemented on the IoT device 50 itself or by an external component which starts a call to the IoT device 50.

The verification unit 53 first checks the validity of the license which, in embodiments, may be provided in the form of a security attribute of the license identifier LK. The security attribute is cryptographically verified and a check is carried out in order to determine whether the license identifier LK has been issued by a known and trusted licensing authority.

The verification unit 53 also checks whether the who attribute, which is contained in the license identifier LK and, in embodiments, may be based on the subject attribute of the VC, corresponds to the current execution environment of the verification unit 53. In one variant, the verification unit 53 determines information relating to the current execution environment of the verification unit 53 itself. This information may be, for example, a hardware identifier (hardware ID). The who attribute does not have the conventional meaning of a VC, but rather represents a checking criterion, in particular an IoT device which is authorized to activate the performance feature and is checked by the verification unit 53 itself in terms of content against a verification platform identifier of the verification platform.

This step is optional since the who attribute need not be assigned. In the case of licenses which are not tied to a specific execution environment, for example device entity, the who attribute is free or undefined. Instead of the attribute "subject", it is also possible to use another attribute mentioned in a VC in order to specify the target execution environment in the license identifier LK.

Furthermore, a what attribute in the license identifier LK is checked by the verification unit 53. The what attribute indicates further conditions for activating the performance feature or for activating options of the performance feature. The what attribute may be represented by the attribute "claim" of a VC in embodiments. The verification unit 53 accepts the license identifier LK or the verifiable presentation formed therefrom only if the conditions which are included in the what attribute and characterize the relevant permissible execution environment correspond to the determined characteristics of the execution environment. For this purpose, the performance features are checked in the IoT device in order to determine which of the performance features is enabled by this license identifier LK. For this purpose, a list of possible performance feature parameters is checked. A check is carried out in order to determine whether they can be confirmed as correct by the what attribute in the license identifier LK. If this is the case, only the performance features indicated as permissible in the license identifier LK are activated or enabled by the verification unit 53.

Figure 3:
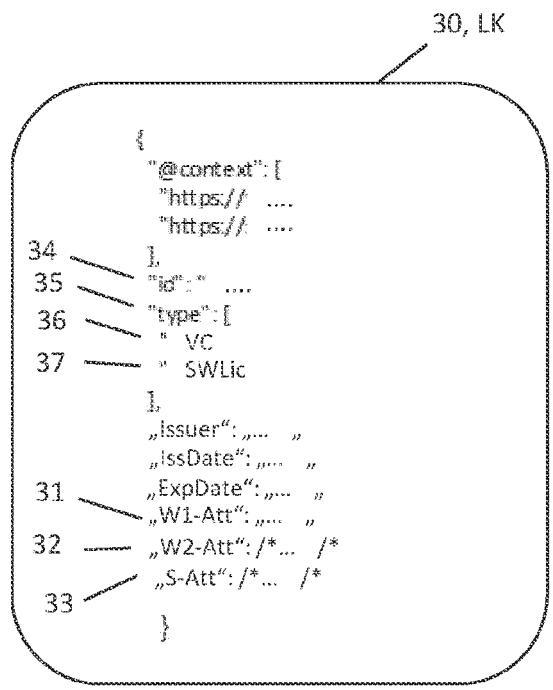
FIG. 3 shows a schematic illustration of an exemplary embodiment of a data structure of a license identifier.

FIG. 3 shows an example of an exemplary embodiment of a data structure according to embodiments of the invention of a license identifier 30 in machine-readable coding of license conditions. The license identifier 30 In a parameter "@context" reference may be made to the specification of the W3C verifiable credential in embodiments. The document contains attributes typical of verifiable credentials. A unique identifier for a license is indicated in the attribute "id" 34. For an evaluation that can be automated, a verifiable credential VC is indicated by the reference sign 36 and a license identifier is indicated by "SWLic" at the reference sign 37 in the attribute "type" 35. The attributes "Issuer", "IssDate" and "ExpDate" contain information relating to a license issuing unit that issues the license identifier 30 or generally a licensor, an issue date and an expiry date. The attribute "ExpDate" is filled in only in the case of a license identifier with a time limit.

The license identifier 30 comprises the who attribute W1-Att 31, a what attribute W2-Att 32 and a security attribute S-Att 33. The who attribute W1-Att 31 is typically contained in the "subject" attribute, a what attribute W2-Att 32 is typically contained in the "claim" attribute and a security attribute S-Att 33 is typically contained in the "proof" attribute of a VC.

Since there is no accessing party in the conventional sense of the VC during the license check, the who attribute 31 or a subject indication may be missing in the license identifier 30 or may be used otherwise, for example in order to code information relating to the target indication. However, the who attribute 31 may be used to code an explicit target indication in embodiments. This is, for example, the IoT device 50 for which the license is intended. In a further embodiment variant according to embodiments of the invention, further environmental information, for example an operator ID, location, runtime environment, software application, device type or version, can also be included in the who attribute 31.

Figure 4:
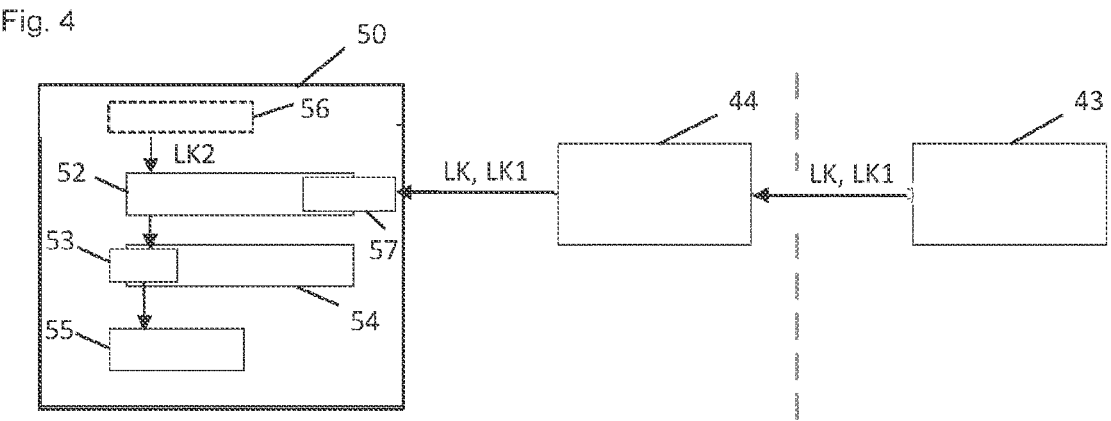
FIG. 4 shows a schematic illustration of an exemplary embodiment of an arrangement having an IoT device.

As already mentioned further above, FIG. 4 shows an exemplary embodiment of an arrangement according to embodiments of the invention comprising the IoT device 50, for example an industrial device, and an external license issuing unit 43. The device 50 is arranged in an environment of a licensor 41, for example a factory. The license issuing unit 43 is arranged, for example, in an environment of a provider 42 of the application or the performance feature, for example in a cloud backend. The device 50 comprises a pseudo-holder unit 52 with a storage unit, a verification unit 53 and a hardware component 55 which forms a trust anchor, for example, and confirms parameters of the hardware component 55. The license issuing apparatus 43 creates and confirms the license identifier LK and transmits it to the IoT device 50. This may be effected using a production operational management unit 44.

A performance feature, for example an application, starts and is ready for operation, but does not perform any functionality for which a license is required.

The license identifier LK not only positively confirms attributes as correct, but, in one embodiment variant, defines additionally required additional checks which are checked by the verification unit 53. The attributes positively confirmed in the license identifier LK can be used as correct only provided that the defined additional checks are checked as being correct. This is carried out independently of a verifiable credentials system or by checking further verifiable credentials.

In one variant, a second license issuing device 56 arranged locally on the execution plane of the virtual or physically real IoT device 50 provides a second license identifier LK2 which confirms properties of the execution environment in which the verification unit 53 is executed. This second license identifier LK2 may also be referred to as VC platform information since it confirms the platform on which a functionality, here the verification unit 53, is executed. In this case, the verification unit 53 checks whether the information relating to the required execution environment in the second license identifier corresponds to the information relating to the actual execution environment in VC platform information.

When using a license identifier which is in the form of an anonymous verifiable credential, is based on a privacy preserving credential and is referred to as an anonymous license identifier below; a special type of check may also be carried out: the anonymous license identifier only makes it possible to determine whether specific attributes are present, that is to say are confirmed as correct by the anonymous license identifier, in the form of a verifiable credential VC or a verifiable presentation. However, the information may not be read directly, as in the case of explicitly coded license identifier data structures, but rather may only be determined by checking whether a specific attribute is confirmed as correct by the anonymous license identifier. An anonymous license identifier represents the statements confirmed by the license issuing unit 43 in a tamperproof and privacy-protected manner. The check is carried out in a similar manner to that generally described above. The difference is that the anonymous license identifier or its verifiable presentation does not contain the corresponding information in an explicitly coded form in the attributes, but rather in a privacy-protected form which only allows the presence of attributes to be checked.

In one development, the license identifier additionally contains meta information which defines the extent of the "scope" check, that is to say defines the set of attributes to be checked.

In order to carry out the license check, also called license enforcement, the validity of the license identifier is performed by verifying the security attribute, that is to say a signature of the licensor or the license issuing authority 43. A runtime environment 54 is additionally also checked depending on the license criteria to be checked. In the example shown in FIG. 4, the license is tied to a specific hardware entity. This may likewise be cryptographically verified, for which credentials of the hardware entity are used in a protected manner, for example using a hardware-based or hardware-tied trust anchor 55. In order to check a usage environment, the license check can also include, for example, checking that the application is operated only in a valid customer environment. For this purpose, a "client" attribute, for example, is provided as part of the how attribute 32. It is coded by a DID. The check may take place, for example, by transferring an additional, third license identifier that identifies the licensee.

The license checking method shown may be efficiently used, for example, to manage/control container infrastructures. Containers or a container image or a virtual machine image or an application can only be started when there are appropriate VC (which express the license). Furthermore, functionalities of an app execution environment (runtime environment RTE, in particular of an edge component), for example load balancing, migration of running entities, fail over, full memory encryption, disk encryption, confidential computing, may also be activated on the basis of a VC license. Furthermore, the use of hardware accelerators, for example a graphics processor GPU, an AI accelerator, a crypto accelerator or a network accelerator, can be enabled on the basis of VC license information.

After successful license validation, the license identifier may be stored in the device. As a result, a renewed license check can be carried out, after the IoT device/application has been restarted, during starting, with the result that no renewed initialization is required. License identifiers can therefore be used in a similar manner to license files.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for checking a license for using at least one performance feature in an Internet-of-Things (IoT) device on the basis of a license identifier, comprising:
   stipulating at least one license condition for using a performance feature of the IoT device by at least one attribute contained in the license identifier,
   transmitting and storing the license identifier on the IoT device,
   checking the license conditions by
   a) generating pseudo-access assigned to the performance feature of the IoT device by a pseudo-holder unit formed on the IoT device, wherein the pseudo-holder unit combines Verifiable Credentials (VC) roles of verifier and holder and internally carries out pseudo-access for enabling performance features, and
   b) checking an authorization for the pseudo-access by checking the attributes of the license identifier by a verification unit formed on the IoT device, and
   activating the at least one performance feature if the pseudo-access is confirmed as permitted by a positive checking result for the license identifier,
   wherein the performance feature includes at least one of: a support for at least one protocol, a higher or lower sampling rate, and an accuracy of sensor data,
   wherein the license identifier, the pseudo-holder unit and the verification unit are configured on the basis of a specification for VC of a World Wide Web Consortium (W3C), and the license identifier is based on a structure of the VC, the verification unit corresponds to a modified verifier and the pseudo-holder unit corresponds to a modified holder which is configured as a local unit on the IoT device and provides the verification unit with the license identifier, and
   wherein the pseudo-access is generated and checked when starting the IoT device or when starting the performance feature on the IoT device, and/or the pseudo-access is repeatedly generated and checked during operation wherein the pseudo-access operations are repeated during ongoing operation, and a performance feature is activated or enabled at a later time depending on a result or is deactivated or blocked in an event of a negative result during operation.

2. The method as claimed in claim 1, wherein the license identifier is stored on the IoT device before or during operation of the IoT device.

3. The method as claimed in claim 1, wherein the license identifier is transmitted again to the IoT device during operation of the IoT device and the stored license identifier is replaced or supplemented.

4. The method as claimed in claim 1, wherein the IoT device is in the form of a physically independent device or is in the form of a software-based virtual device distributed over one or more hardware platforms.

5. The method as claimed in claim 1, wherein the pseudo-holder unit of the IoT device is formed as part of a software application, as part of an execution environment of the software application, or by an operating system of the IoT device.

6. The method as claimed in claim 1, wherein the pseudo-holder unit and the verification unit are formed on a common platform or the pseudo-holder unit and the verification unit are formed on different platforms that are locally connected to one another.

7. The method as claimed in claim 6, wherein the verification unit checks a who attribute in the license identifier, which indicates an IoT device authorized to activate the performance feature, against a verification platform identifier of the verification platform.

8. The method as claimed in claim 1, wherein the verification unit checks a what attribute in the license identifier, which indicates further conditions for activating the performance feature or for activating options of the performance feature.

9. The method as claimed in claim 1, wherein the verification unit checks a security attribute in the license identifier, which comprises a cryptographic identifier of an issuer of the license identifier.

10. The method as claimed in claim 7, wherein a first license identifier is issued by a license creation unit outside the IoT device and/or a second license identifier is issued by a license creation unit inside the IoT device and is stored on the IoT device, and
the first license identifier specifies properties of the execution environment in which the verification unit is executed,
the second license identifier comprises the properties actually available in the IoT device, and
the first and second license identifiers are checked by the verification unit against the properties of the present execution environment of the verification unit.

11. The method as claimed in claim 1, wherein the license identifier is in the form of an anonymous Verifiable Credential (VC), and the verification unit checks only the presence of at least one specific attribute, but not the content of the attribute.

12. The method as claimed in claim 1, wherein the performance feature is a software container, and the license identifier is used to manage and control a software container infrastructure, or the performance feature is a software application or a hardware component of the IoT device.

13. A computer program product comprising a computer readable hardware storage device having computer readable program code stored therein, said program code executable by a processor of a computer system to implement the method as claimed in claim 1.

14. An arrangement for checking a license for using at least one performance feature in an Internet-of-Things (IoT) device on the basis of a license identifier, comprising:
a license issuing unit which is configured
to stipulate at least one license condition for using a performance feature of the IoT device by at least one attribute contained in the license identifier,
to transmit the license identifier to the IoT device,
wherein the IoT device is configured
to store the license identifier,
to check the license conditions by
a) generating pseudo-access assigned to the performance feature of the IoT device by a pseudo-holder unit formed on the IoT device, wherein the pseudo-holder unit combines Verifiable Credentials (VC) roles of verifier and holder and internally carries out pseudo-access for enabling performance feature, and
b) checking an authorization for the pseudo-access by checking the attributes of the license identifier by a verification unit formed on the IoT device, and
to activate the at least one performance feature if the pseudo-access is confirmed as permitted by a positive checking result for the license identifier,
wherein the performance feature includes at least one of:
a support for at least one protocol, a higher or lower sampling rate, and an accuracy of sensor data, and
wherein the license identifier, the pseudo-holder unit, and the verification unit are configured on the basis of a specification for VC of a World Wide Web Consortium (W3C), and the license identifier is based on a structure of the VC, the verification unit corresponds to a modified verifier and the pseudo-holder unit corresponds to modified holder which is formed as a local unit on the IoT device and provides the verification unit with the license identifier, and
wherein the pseudo-access is generated and checked when starting the IoT device or when starting the performance feature on the IoT device, and/or the pseudo-access is repeatedly generated and checked during operation wherein the pseudo-access operations are repeated during ongoing operation, and a performance feature is activated or enabled at a later time depending on a result or is deactivated or blocked in an event of a negative result during operation.

15. A computer system for checking a license for using at least one performance feature in an Internet-of-Things (IoT) device on the basis of a license identifier, the system comprising:
a processor; and
a memory storing computer executable instructions that, when executed by the processor, cause the processor to perform the steps of:
stipulating at least one license condition for using the performance feature of the IoT device by at least one attribute contained in the license identifier,
transmitting and storing the license identifier on the IoT device,
checking the license conditions by
a) generating pseudo-access assigned to the performance feature of the IoT device by a pseudo-holder unit formed on the IoT device, wherein the pseudo-holder unit combines Verifiable Credentials (VC) roles of verifier and holder and internally carries out pseudo-access for enabling performance feature, and
b) checking an authorization for the pseudo-access by checking the attributes of the license identifier by a verification unit formed on the IoT device, and activating the at least one performance feature if the pseudo-access is confirmed as permitted by a positive checking result for the license identifier, wherein the performance feature includes at least one of: a support for at least one protocol, a higher or lower sampling rate, and an accuracy of sensor data, wherein the license identifier, the pseudo-holder unit and the verification unit are configured on the basis of a specification for VC (VC) of a World Wide Web Consortium (W3C), and the license identifier is based on a structure of the VC (VC), the verification unit corresponds to a modified verifier and the pseudo-holder unit corresponds to a modified holder which is configured as a local unit on the IoT device and provides the verification unit with the license identifier, and wherein the pseudo-access is generated and checked when starting the IoT device or when starting the performance feature on the IoT device, and/or the pseudo-access is repeatedly generated and checked during operation wherein the pseudo-access operations are repeated during ongoing operation, and a performance feature is activated or enabled at a later time depending on a result or is deactivated or blocked in an event of a negative result during operation.

* * * * *